(12) United States Patent
Krumböck et al.

(10) Patent No.: US 9,636,861 B2
(45) Date of Patent: May 2, 2017

(54) EXTRUSION DEVICE AND METHOD FOR INFLUENCING WALL THICKNESSES OF AN EXTRUDED PLASTIC PROFILE

(75) Inventors: Erwin Krumböck, Ansfelden (AT); Leopold Weiermayer, Wartberg/Krems (AT); Karl Gebesmaier, Kirchdorf/Krems (AT)

(73) Assignee: GREINER TOOL.TEC GMBH, Nussbach (AT)

( * ) Notice: Subject to any disclaimer, the term of this patent is extended or adjusted under 35 U.S.C. 154(b) by 388 days.

(21) Appl. No.: 14/112,094

(22) PCT Filed: Apr. 18, 2012

(86) PCT No.: PCT/EP2012/057045
§ 371 (c)(1),
(2), (4) Date: Oct. 16, 2013

(87) PCT Pub. No.: WO2012/143373
PCT Pub. Date: Oct. 26, 2012

(65) Prior Publication Data
US 2014/0035189 A1    Feb. 6, 2014

(30) Foreign Application Priority Data

Apr. 18, 2011    (DE) .................. 10 2011 007 618

(51) Int. Cl.
*B29C 47/86*    (2006.01)
*B29C 47/92*    (2006.01)
(Continued)

(52) U.S. Cl.
CPC ............ *B29C 47/92* (2013.01); *B29C 47/003* (2013.01); *B29C 47/0023* (2013.01);
(Continued)

(58) Field of Classification Search
CPC . B29C 47/0028; B29C 47/862; B29C 47/864; B29C 47/866; B29C 47/904;
(Continued)

(56) References Cited

U.S. PATENT DOCUMENTS 4,332,543 A * 6/1982 Fulton ..................... B29C 47/32
                                                                    264/40.6
4,541,792 A * 9/1985 Zakic .................. B29C 47/0893
                                                                    425/143

(Continued)

FOREIGN PATENT DOCUMENTS

DE    22 34 876 A1    1/1973
DE    22 32 930 A1    2/1973
(Continued)

*Primary Examiner* — Alison L Hindenlang
*Assistant Examiner* — Joseph Leyson
(74) *Attorney, Agent, or Firm* — Maschoff Brennan

(57) ABSTRACT

The invention relates to an extrusion device and an extrusion method for the extrusion of plastic profiles, in particular a nozzle plate, comprising at least one flow channel for plastic melt. At least one wall region of the flow channel can be temperature controlled in a targeted manner with a local temperature control device for setting the flow speed of the plastic melt.

21 Claims, 9 Drawing Sheets

(51) Int. Cl.
   *B29C 47/00*   (2006.01)
   *B29C 47/02*   (2006.01)
   B29C 47/90   (2006.01)
   B29C 47/88   (2006.01)
(52) U.S. Cl.
   CPC ........ *B29C 47/0028* (2013.01); *B29C 47/021* (2013.01); *B29C 47/862* (2013.01); *B29C 47/864* (2013.01); *B29C 47/866* (2013.01); *B29C 47/884* (2013.01); *B29C 47/8835* (2013.01); *B29C 47/904* (2013.01); *B29C 47/905* (2013.01); *B29C 2947/926* (2013.01); *B29C 2947/92152* (2013.01); *B29C 2947/92647* (2013.01); *B29C 2947/92666* (2013.01); *B29C 2947/92695* (2013.01); *B29C 2947/92704* (2013.01); *B29C 2947/92904* (2013.01)
(58) Field of Classification Search
   CPC .................. B29C 47/905; B29C 47/92; B29C 2947/92152; B29C 2947/926; B29C 2947/92647; B29C 2947/92666; B29C 2947/92695; B29C 2947/92704; B29C 2947/92904
   See application file for complete search history.

(56) References Cited

U.S. PATENT DOCUMENTS

| | | | |
|---|---|---|---|
| 4,548,570 A | 10/1985 | Hahn et al. | |
| 4,793,788 A * | 12/1988 | Borger | B29C 47/90 425/141 |
| 6,409,494 B1 | 6/2002 | Voss | |
| 6,799,961 B1 * | 10/2004 | Freynhofer | B05C 5/0262 425/141 |
| 2009/0174107 A1 * | 7/2009 | Kossl | B29C 47/0028 264/167 |

FOREIGN PATENT DOCUMENTS

| | | |
|---|---|---|
| DE | 35 037 21 A1 | 8/1986 |
| DE | 198 23 304 A1 | 12/1999 |
| DE | 10 2008 047 206 A1 | 4/2010 |
| GB | 1 396 538 A | 6/1975 |
| WO | 2009/003662 A2 | 1/2009 |

* cited by examiner

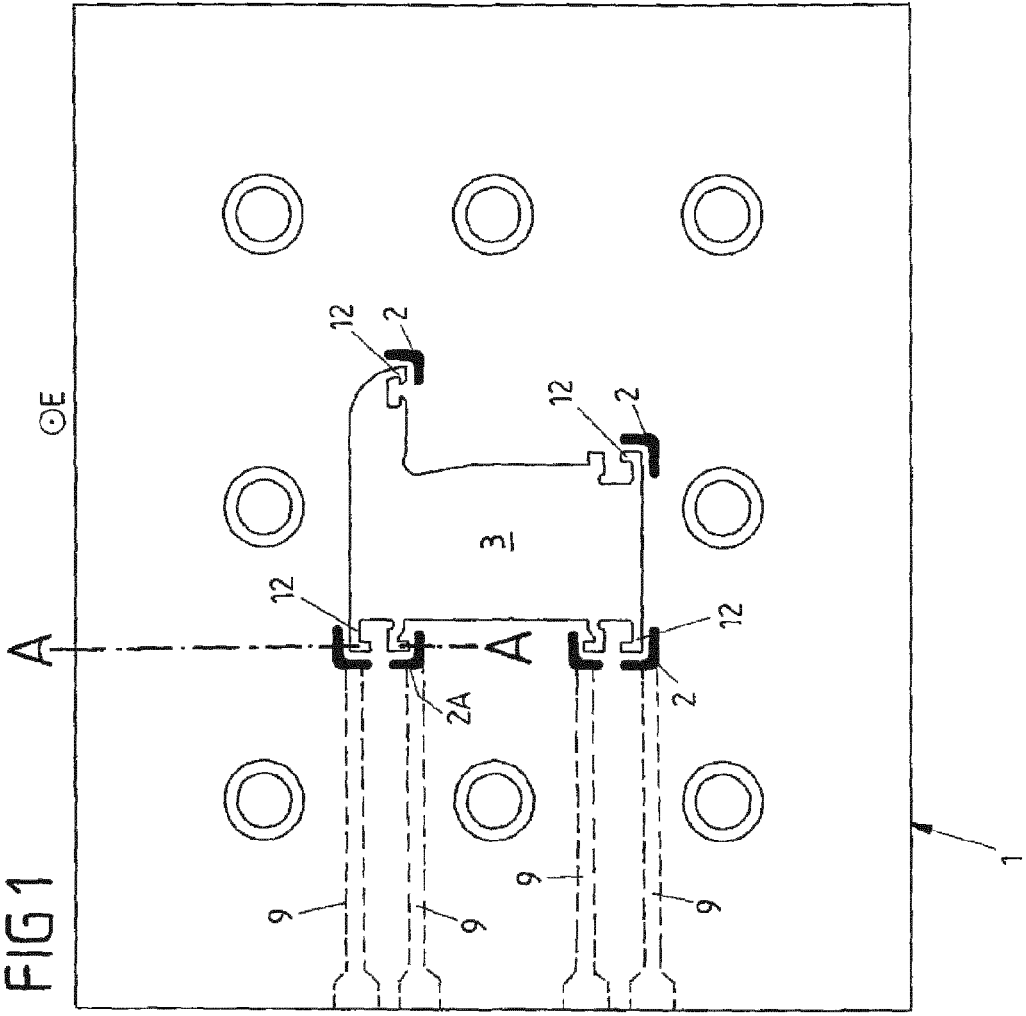
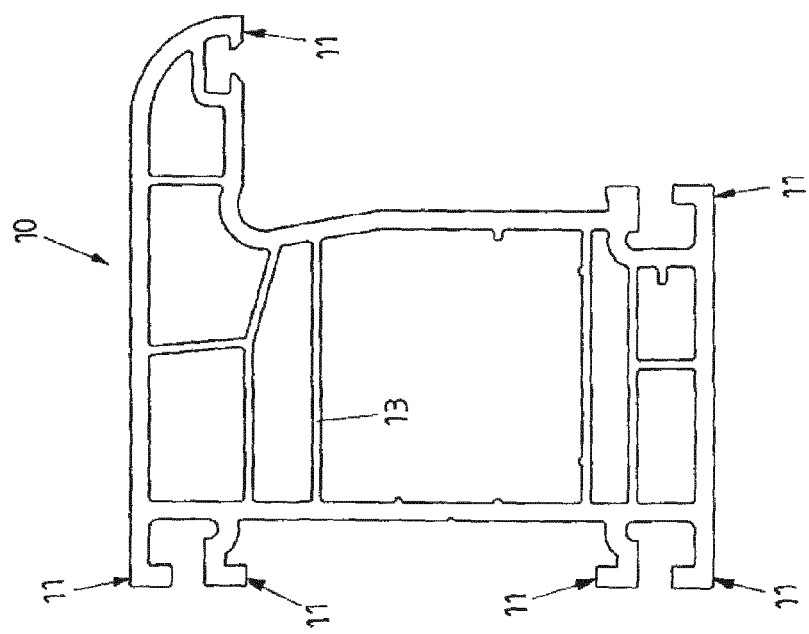

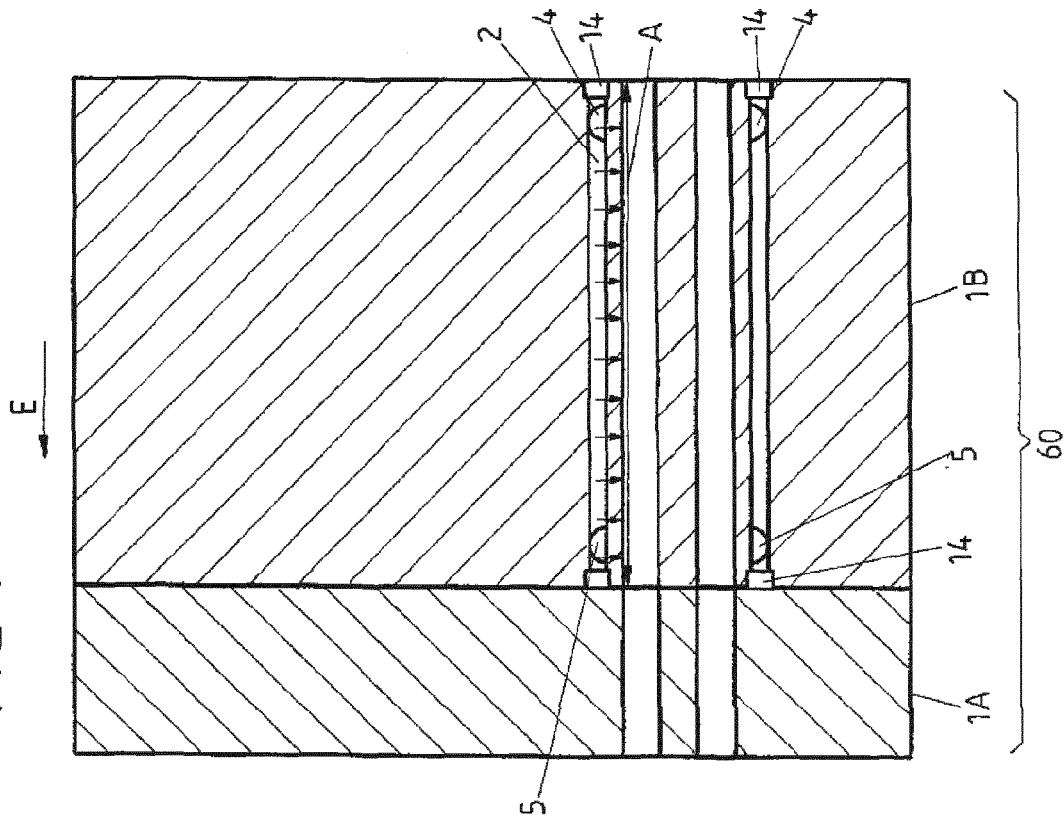
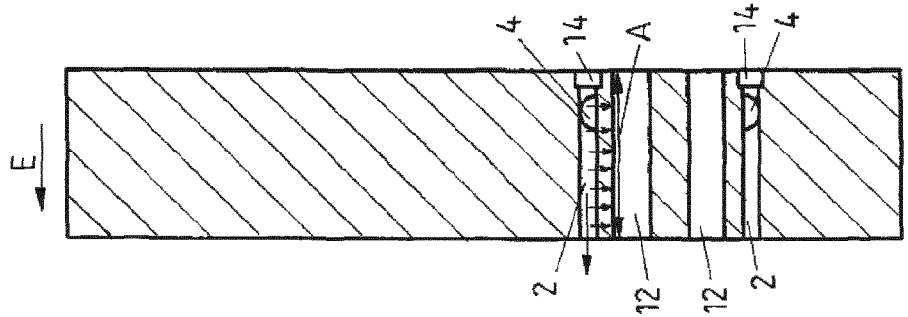

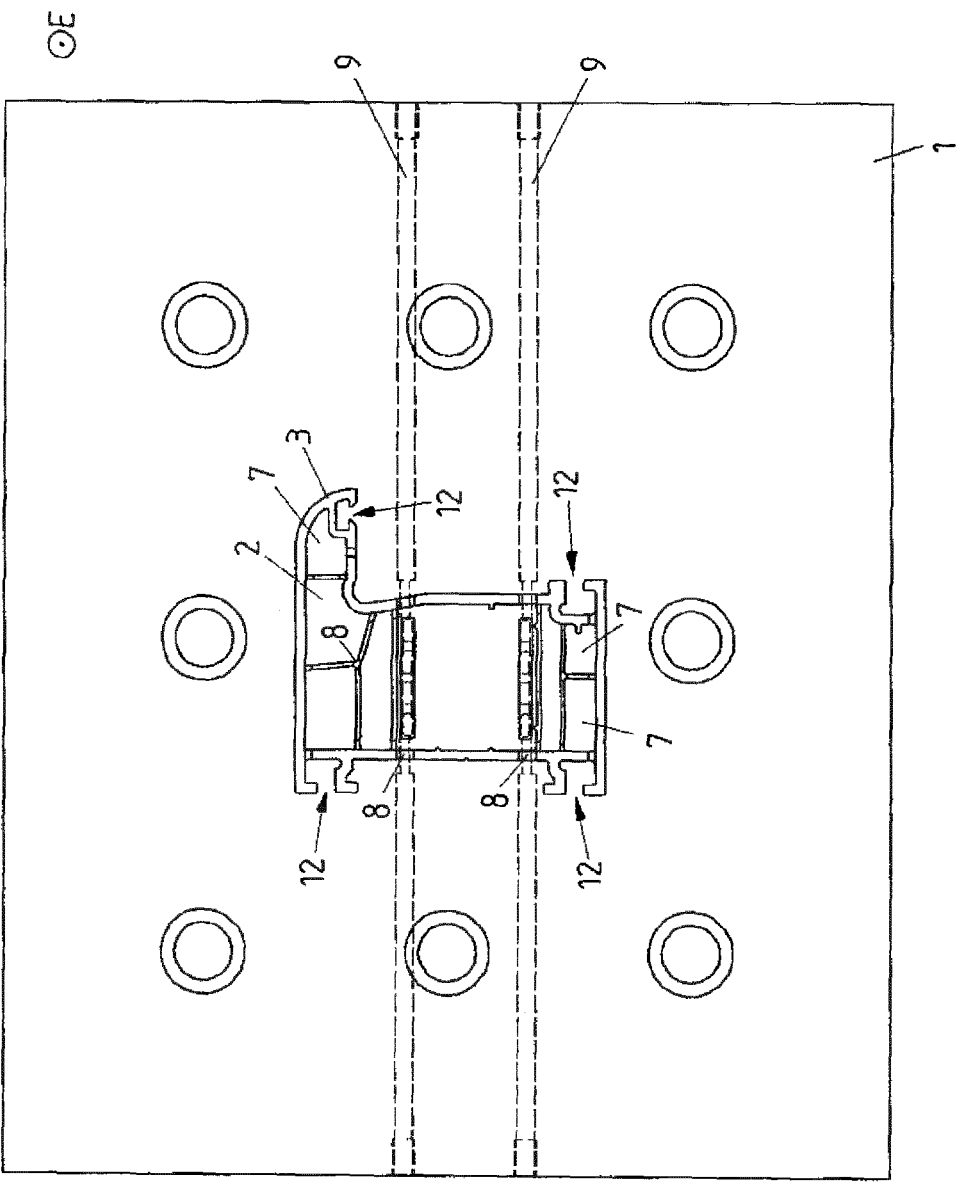

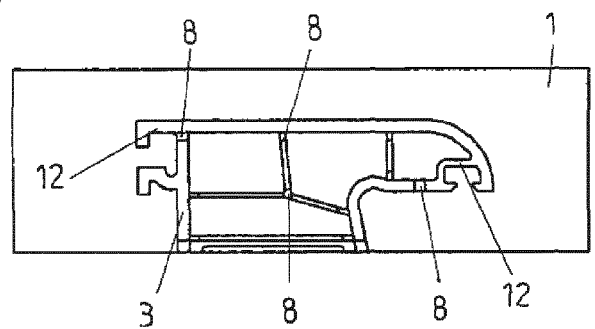
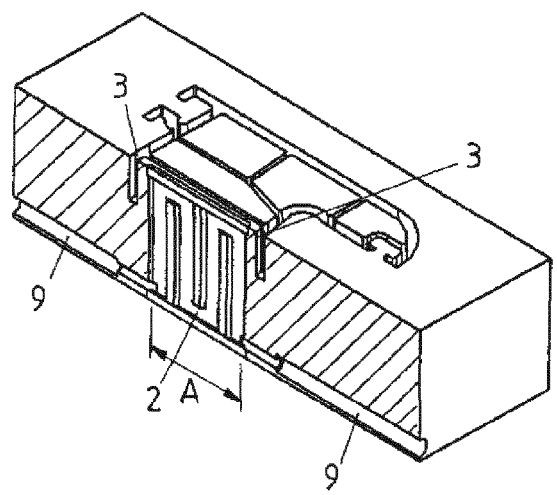
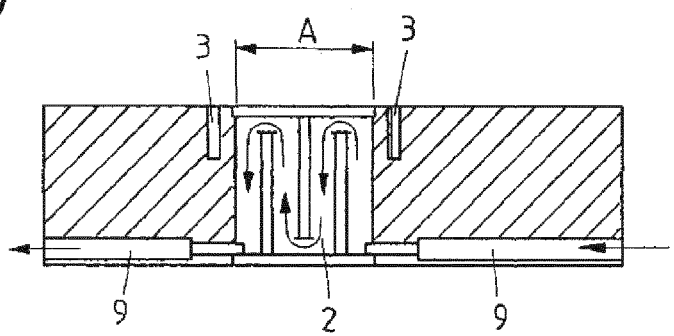

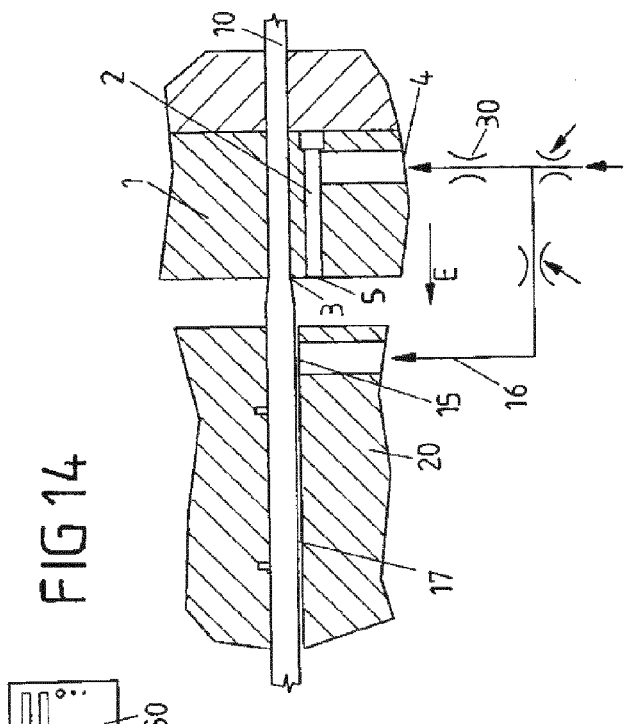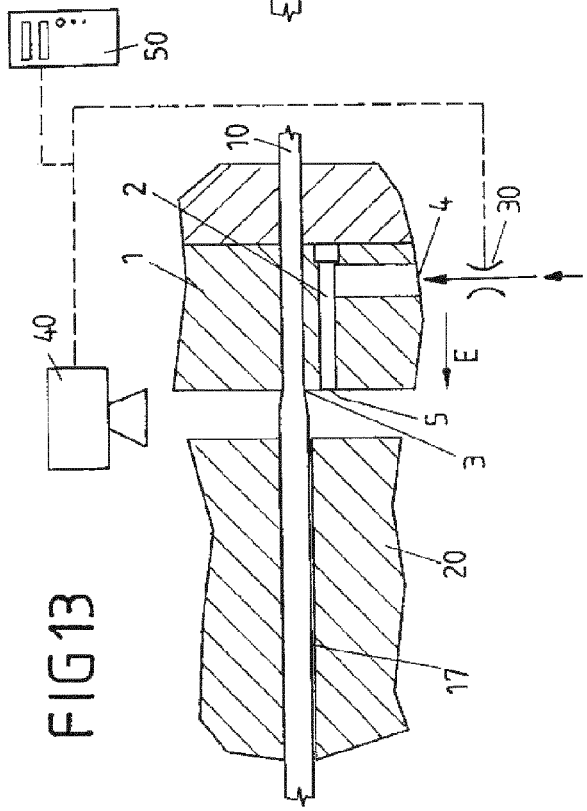

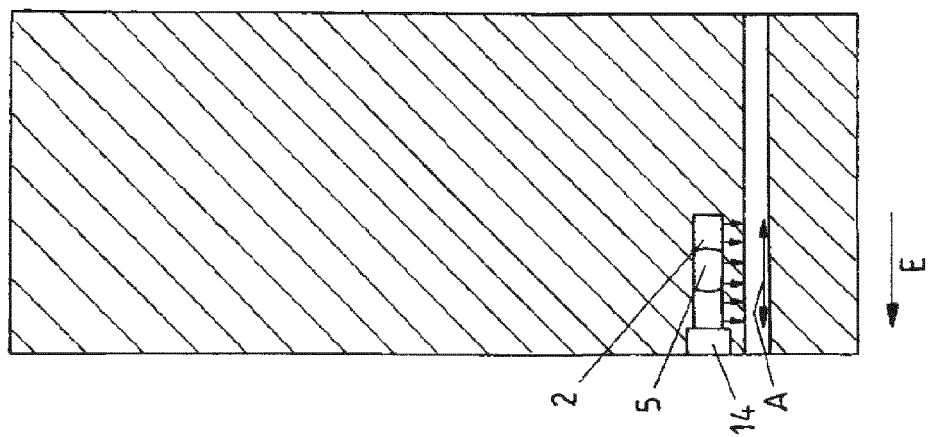
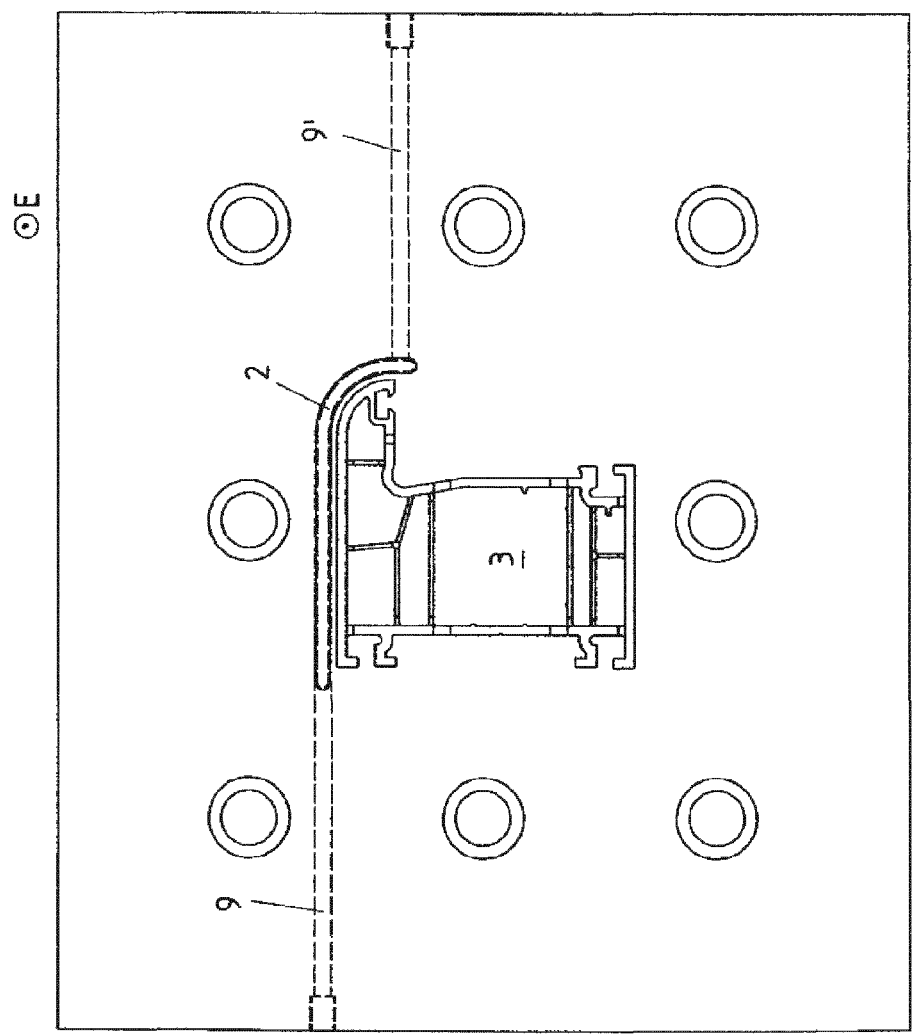

EXTRUSION DEVICE AND METHOD FOR INFLUENCING WALL THICKNESSES OF AN EXTRUDED PLASTIC PROFILE

CROSS-REFERENCE TO A RELATED APPLICATION

This application is a National Phase Patent Application of International Patent Application Number PCT/EP2012/057045, filed on Apr. 18, 2012, which claims priority of German Patent Application Number 10 2011 007 618.2, filed on Apr. 18, 2011.

BACKGROUND

The invention relates to an extrusion device for influencing the wall thickness of an extruded plastic profile and a method for influencing the wall thickness of an extruded plastic profile.

Plastic profiles are often produced by extrusion. A mostly homogeneous plastic melt is prepared in an extruder and brought to a pressure of about 200 to 400 bar and a temperature of about 200° C. The plastic melt is pressed with a high pressure through an extrusion nozzle. The outlet of the extrusion nozzle has approximately the shape of the desired plastic profile.

After the plastic melt leaves the extrusion nozzle, the extruded plastic profile, for instance in form of a melting strand, enters a calibration device in order to be cooled down in said device by maintaining the profile shape. Calibration devices for the production of comparatively complicated plastic profiles, as for instance window profiles as hollow profiles, comprise usually a dry calibration area and a subsequent wet calibration area.

The wall thicknesses of the plastic profile are thereby determined largely in the nozzle.

A change of the wall thicknesses in the calibration is almost not possible. In case of hollow chamber profiles the corresponding outer wall is sucked to the calibration and is then cooled mainly via heat dissipation. No influence which could provide a change of the wall thicknesses can be exerted onto the inner side of said outer wall (i.e. within the plastic profile).

In case of, for instance single walled, profile sections projecting from the plastic profile, as for instance hooks or noses, a pressure force could be exerted on both sides in the calibration, which would displace material sideways and would thus provide a lower wall thickness. Practically, this is only possible to a very limited extend, since a clamping force required thereto would inevitably provide a friction force, which cannot be transferred by the still soft, viscous plastic mass. The affected profile section would get stuck in the gap being too narrow and would lead to a breakaway of the profile strand.

The gap or the shape in the calibration has thus always to be larger for shaping single walled sections than the corresponding wall thickness or shape of the plastic profile in order to avoid reliably that the extruded plastic profile gets caught in the calibration, also if due to slightly, unavoidable deviations of the throughput from the extruder corresponding deviations of the wall thicknesses are transferred onto to the plastic profile. It is thus common to realize the gap in the calibration about 0.1 to 0.3 mm, in particular 0.2 mm larger than it corresponds to the wall thickness of the profile.

When producing extrusion devices a substantial construction effort in the extrusion nozzle is required in order to guarantee the wall thicknesses in all profile sections of the extruded plastic profile. This effort relates to changes of the gap width in the flow channels of the extrusion nozzles along the flow path.

The wall thicknesses of the plastic profile are only reproducible as long as the extrusion conditions do not change. The extrusion conditions relate to all parameters in the extruder (extruder type and size, temperature course in the cylinder, rotation speed of the screw, throughput and such) as well as the material (formulation, mixing conditions, moisture content and others).

Each change of the mentioned parameters can cause a change of wall thicknesses at specific sections of the profile, i.e. the whole plastic profile does not tend to become thicker or thinner, but the effects are sectionally different.

A requirement from an economical perspective is to produce plastic profiles with a meter weight as low as possible and to fulfil simultaneously all quality requirements (geometry, minimal wall thicknesses, mechanical stability, gloss and such). It is for instance not possible to provide outer walls being sectionally thinner than determined in relevant standards. The unavoidable interactions during the conventional extrusion have to be considered: If a profile is produced close to the minimal meter weight with good quality this means that each profile section comprises approximately the lower permitted wall thickness.

If due to any disturbance in a profile section, for instance at a hook, the minimal wall thickness is fallen below, a further negative shaping of the local geometry (for instance "hanging" of an edge or an inaccurate shaping of the undercut of the hook) is often also provided.

In order to transfer this one profile section into the right quality, it is a common measure either to increase the throughput or to reduce the withdrawal velocity. Each of both measures provides a local thickening of the wall thickness in the respective profile section, but also inevitable to a thickening of all other profile sections. After all a plastic profile with the corresponding quality is produced, however a higher material input is required.

SUMMARY

It is an object to develop an extrusion device and a method with which the distribution of the wall thicknesses of an extruded plastic profile can be efficiently and specifically influenced.

An extrusion device for the extrusion of plastic profiles comprises a flow channel for plastic melt. An example for such an extrusion device is a nozzle plate. According to an exemplary embodiment of the invention at least one wall region of the flow channel can be temperature controlled in a targeted manner with a local temperature control device for setting the flow speed of the plastic melt.

Since the flow behavior of the plastic melt depends on the temperature due to the temperature dependency of the viscosity itself, the flow velocity changes locally depending on the temperature control. Due to the local target temperature control at at least one wall region it is possible to influence selectively the wall thicknesses of the assignable cross sections of the plastic profile, thus almost without effects onto the remaining profile sections. This is in particular the case with single walled profile sections projecting from the plastic profile.

The wall thicknesses for instance of single walled profile sections like hooks can be influenced thereby by features in the extrusion nozzle, in order to prevent on the one hand a getting stuck of the plastic profile in the calibration due to a wall thickness being too large and to prevent on the other hand inadmissible geometrical deviations due to a wall thickness being too low (for instance incompletely shaped edges).

An embodiment is of an advantage, if the temperature of the at least one wall region of the flow channel is up to 30° C. above or below the medium temperature of the extrusion nozzle. This temperature range is sufficient in order to cause an effective change of the flow conditions.

It is further of an advantage if in an variant the local temperature control device is arranged in spatial proximity to the wall region to be temperature controlled, in particular also in proximity of the outlet opening of the extrusion nozzle. In this region a targeted change of the flow velocity is in particular effective. Specifically, it is of an advantage, if in an embodiment the at least one wall region is arranged between 0 to 100 mm upstream from the outlet of the extrusion nozzle and/or the at least one wall region to be temperature controlled has a length dimension of about 20 to 80 mm and/or a width dimension of about 3 to 20 mm.

In a further embodiment the at least one wall region to be temperature controlled in the nozzle outlet plate is arranged directly upstream of the outlet of the extrusion nozzle, wherein the at least one wall region has a dimension in extrusion direction of 5 to 20 mm, preferably 6 to 10 mm, and a dimension crosswise to the extrusion direction of about 20 to 150 mm, preferably over the complete width of the assigned profile area. In this embodiment the temperature control device does not extend far into the extrusion nozzle, but rather is arranged purposely only in a small region at the outlet. Thereby, it can be meaningful that the temperature control device extends over a larger region of the extrusion profile for instance in order to enforce the gloss.

The local temperature control device does not have always to be one singular part, but it can be of an advantage in embodiments, if the local temperature control device comprises at least one temperature control channel, at least one electrical heating means, in particular an induction or resistant heating and/or at least one thermoelectrical element. Combinations of temperature control elements are thereby also possible, which form together the local temperature control device. Thus, it is absolutely possible to use one part of the local temperature control device only for cooling and another one for heating. It is also possible to use the same component (for instance temperature control channels) at different times for heating and/cooling.

It is thereby of an advantage in an embodiment, if a temperature control channel can be flown through by a temperature control medium, in particular room air, cold and/or heated air, a gas and/or a liquid, wherein the flow through by a liquid occurs in particular in a closed cycle and the flow through by a gas occurs in an open cycle. When using air, for instance room air for cooling, the process in an open cycle is of a particular advantage since the air can be simply blown again into the room. The temperature and/or the flow velocity, summarized the temperature control effect of the device thereof, can thereby be changed, either separate for each single temperature control channel or together for all temperature control channels or together for groups of temperature control channels.

A preferred variant exists for cooling if the cooled temperature control medium, in particular in case of gas, has a temperature between −50° C. to 30° C. and in case of a liquid has a temperature between 15° C. and 180° C., wherein in particular only the outlet zone of the extrusion nozzle is cooled.

A preferred embodiment for a heating is present if the mentioned temperature control medium, in particular in case of gas, has a temperature between 250° C. to 500° C. and in case of a liquid has a temperature between 200° C. and 280° C., wherein in particular only the outlet zone of the extrusion nozzle is heated.

It is of an advantage, if an embodiment comprises at least one temperature control channel with an width extension according to the width dimension of the assigned wall region of the flow channel to be temperature controlled and/or the gap height of at least one temperature control channel is between about 0.3 mm to 5 mm, preferably up to 2 mm. These dimensions are suited to guarantee an efficient heat transfer from the temperature control channel to the plastic melt.

It is further of an advantage if the local temperature control device of an embodiment is thermotechnically insulated in respect to the extrusion device, in particular the extrusion nozzle, in particular a nozzle plate with an air gap and/or by means of a heat insulating intermediate layer such that higher temperature differences can be effective on the surface of the flow channel.

An embodiment is of preferred advantage if a coupling to an operation or control device for controlling the local temperature control device for influencing the wall thickness of the plastic profile exists, wherein at least one measured value is the wall thickness, the gap size of an air gap in a calibration device, a spatial extension of the plastic profile after leaving the extrusion nozzle and/or a measured back pressure in the calibration device.

It is of an advantage in an embodiment, if the flow velocity, the rate of flow, the pressure and/or the temperature of the temperature control medium, in particular air, can be specifically adjusted before being fed into the temperature control device. A heating or cooling of the temperature control medium can occur efficiently before entering the nozzle.

It is thereby of an advantage, if in an embodiment an operation or control device can perform a timely change of the temperature control of the at least one wall region in a targeted manner, in particular for adjusting a controlled slow temperature transfer (5 to 15 K/min).

Additionally or alternatively the temperature of the temperature control medium can also be changed in embodiments in that the flow velocity of the temperature control medium in the local temperature control device (for instance a heating or cooling channel) is changed by providing a throttle device for the inlet, wherein the throttle device can be coupled in particular to an operation or control device.

Furthermore, a preferred embodiment is present if a thermal insulating device for the temperature control medium is provided for at least one subarea in the nozzle plate. The insulating device prevents that the temperature of the temperature control medium changes in particular within the nozzle plate in that for instance a temperature loss occurs due to heat transfer. It is thereby of a particular advantage if the insulating device comprises an air gap and/or an insulating material.

The object is also being solved by an extrusion method.

A flow channel for a plastic melt, in particular in a nozzle plate, is thereby provided, wherein the flow velocity of the plastic melt is changed in this flow channel by changing the temperature in at least one wall region of the flow channel by a local temperature control device in the spatial area of the wall region. A change of the temperature of the at least one wall region effects a change of the flow resistance and thus the flow velocity of the plastic melt.

It is thereby of an advantage if in an embodiment of the at least one flow channel it is temperature controlled 30° C. above or below the medium nozzle temperature.

A preferred embodiment is also present if at least one temperature control channel can be flown through by a temperature control medium, in particular air at room temperature, cooled and/or heated air, a gas and/or a liquid, wherein the flow through by a liquid occurs in particular in a closed cycle and the flow through by a gas occurs in an open cycle. The cooled temperature control fluid, in particular gas, is in embodiments preferably in a temperature range between −50° C. to 30° C., in particular at room temperature, wherein in particular only the outlet zone of the extrusion nozzle is temperature controlled. Air with a temperature between 200° C. and 500° C. can be used for heating.

Furthermore, a method is a preferred embodiment at which an operation or control effects a controlling of the local temperature control device for influencing a wall thickness of the plastic profile, wherein at least one measured value is the wall thickness, the gap size of the air gap in a calibration device, a spatial extension of the plastic profile after leaving the extrusion nozzle and/or a measured back pressure in the calibration device. A preferred embodiment is thereby available, if the flow velocity, the rate of flow, the pressure and/or the temperature of the temperature control medium, in particular air, is specifically adjusted before feeding.

BRIEF DESCRIPTION OF THE DRAWINGS

The invention is explained by means of different embodiments.

FIG. 1 shows a front view of the outlet plate of an extrusion tool.

FIG. 2 shows a cross section of an extruded plastic profile adapted to the extrusion nozzle in FIG. 1.

FIG. 3 shows a cross section A-A of FIG. 1 for a first embodiment.

FIG. 4 shows a cross section of an extrusion tool with a second embodiment for a temperature control.

FIG. 6 shows a schematic front view of a fourth embodiment for a temperature control.

FIG. 7 shows a detailed view of the fourth embodiment according to FIG. 6.

FIG. 8 shows a perspective illustration of the view of FIG. 7.

FIG. 9 shows a top view of the sectional plane of FIG. 8.

FIG. 13 shows a schematic illustration of a temperature control with an expansion for a temperature operation.

FIG. 14 shows a schematic illustration of a further embodiment of a temperature operation.

FIG. 15 shows a schematic illustration of a third embodiment of a temperature operation.

FIG. 16 shows a front view of a further embodiment of an outlet plate with a local temperature control device.

FIG. 17 shows a side view of the embodiment according to FIG. 16.

DETAILED DESCRIPTION

Figure 5:
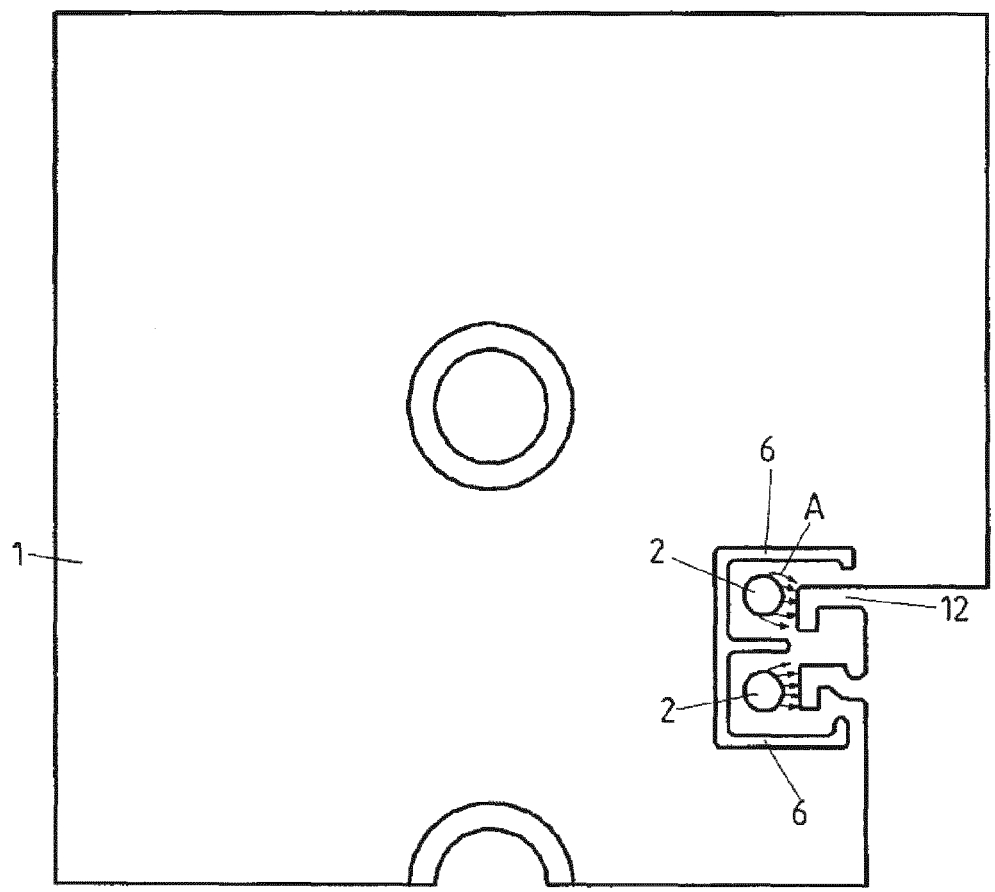
FIG. 5 shows a schematic front view of a third embodiment for a temperature control.

In FIG. 1 a nozzle plate 1 of an extrusion device is illustrated in a front view.

An extrusion device for the extrusion of plastic profiles comprises thereby an extrusion nozzle 60 with a flow channel 3 for the plastic melt. The extrusion nozzle 60 consists of multiple nozzle plates 1A, 1B (see FIG. 3, 4), which is arranged across to the flow direction, which are screwed to each other such that they not open due to the melt pressure and no plastic melt can leak into the parting planes.

The flow channel 3 pushes through each singular nozzle plate 1A, 1B. The flow channel 3 comprises at the inlet into the extrusion nozzle 60 and at the outlet of the melt from the extrusion nozzle 60 a singular closed cross section. The flow channel 3 can be separated along the flow path in multiple branches, that means that the flow channel 3 comprises within a singular nozzle plate 1A, 1B multiple singular cross sections, which are separated from each other often by so called spokes (see FIG. 6). The complete extrusion nozzle 60 is heated to a temperature which corresponds to about the melting temperature. This occurs via one or multiple heating zones. Often four heating zones are provided (not illustrated here due to simplicity reasons), which extend in each case over the complete length of the extrusion nozzle 60 and are assigned to the four main directions (above, below, left and right).

Within the meaning of this invention additional small-scaled local acting temperature control devices 2 are provided. Such a local temperature control device is assigned to a small section of the flow channel wall, a wall region A, in order to be able to locally change the temperature such that subsequently the flow velocity of the melt and thus the wall thickness of the profile in the effective area can be changed.

The local temperature control device is provided according to the invention within an extrusion nozzle 60. Such an extrusion nozzle 60 consists of multiple nozzle plates 1. The extrusion nozzle 60 is thereby the entirety of the metallic parts which are permeated by the flow channel 3.

The nozzle plate on the outlet side is also often designated as outlet plate 1A. As will be explained in the following, the wall region A to be locally temperature-controlled is arranged in close proximity to the flow channel 3, preferably and mostly sufficiently only in the outlet plate 1A or in the second nozzle plate 1B. It is however also possible to form the temperature control zone plate extending over multiple nozzle plates.

In FIG. 1 a nozzle plate 1 of an extrusion nozzle 60 is illustrated in a front view. This view corresponds to the front view of the extrusion nozzle 60.

The extrusion direction E points vertically out of the drawing plane. The corresponding plastic profile 10 is illustrated in a cross section in FIG. 2.

The plastic profile 10 leaves the extrusion nozzle 60. At constant operating parameters in the flow channel 3 (for instance pressure at the inlet of the extrusion nozzle 60, melt throughput, constant temperature and rheological conditions of the melt at the nozzle inlet, temperature course in the extrusion nozzle 60 and others) a certain, local velocity profile of the melt at the outlet of the extrusion nozzle 60 is adjusted.

In FIG. 1 extrusion mandrel parts 7, which are required for forming the extrusion gaps, are not illustrated due to clarity reasons. The extrusion mandrel parts 7 are however illustrated in FIG. 6.

A medium velocity is obtained at each width section of the outlet gap, which provides a throughput which can be assigned to the respective width section via the corresponding crosssectional area. The wall thickness in this width section of the plastic profile 10 (see FIG. 2) depends then additionally also from the withdrawal velocity, which is uniform for the complete profile cross section.

In general, it is an objective when constructing and manufacturing an outlet nozzle plate 1A to design the medium outlet velocity at the outlet of the extrusion nozzle 60 as constant as possible over the complete outlet gap. Physical and rheological effects contradict this objective more or less such that additionally the thickness of the outlet gap has to be adapted in order to change the assignable local wall thickness of the plastic profile 10 and to adapt it to the required profile geometry.

It has now been shown that the local velocity profile at the outlet of the extrusion nozzle 60 can be influenced in a targeted manner by the local temperature of the channel wall of the extrusion nozzle 60, the nozzle wall temperature, at essentially unchanged boundary conditions. If in a width section of for instance 10 mm upstream (i.e. if looked at from the exit of the extrudate) the nozzle wall temperature is reduced and the remaining nozzle wall temperatures remain unchanged then the flow velocity is reduced in this width section. The reduced flow velocity provides a local reduction of the wall thickness—relative to the almost unchanged wall thicknesses of all other profile sections.

A profile section is here to be understood as a part of the plastic profile 10 related to the cross section. The single walled parts 11 on the four corners of the plastic profile 10 are such profile sections (see FIG. 2).

Changes of the nozzle wall temperatures (i.e. temperatures in the wall regions A in the extrusion nozzle 60) in selected profile or nozzle sections of about +/−30° C. from the medium temperature at the extrusion nozzle 60 are allowable without having disturbing effects onto other quality parameters of the plastic profile 10. The adjustment of the extreme values of this temperature range provides changes of the medium flow velocity of about +/−15% opening up the possibility to reduce almost all randomly occurring wall thicknesses deviations due to unavoidable disturbances to the given wall thickness.

This device and this method are of an advantage, In particular during the profile extrusion of window profiles from hard PVC, since the flow profile of the plastic melt with the hereby used PVC formulations is determined in contrast to other plastics predominantly by wall sliding.

The plastic melt slides directly along the steel wall of the flow channel 3; at best a thin lubricant layer of deposited lubricant is there between. The velocity at the wall of the flow channel 3 is not zero.

Specific changes of the nozzle wall temperature effect therefore directly the sliding resistance of the plastic melt. A lower nozzle wall temperature increases the sliding resistance and provides thus a lower sliding speed.

Almost all other plastic melts except PVC are dominated by shear flowing wherein the melt adheres to the steel wall. Hereby, the velocity on the wall of the flow channel 3 is zero and is the largest in the medium plane; the course corresponds to about a parabola of a higher order. In case of such melts a specific change of the nozzle wall temperature effects less the flow velocity or the medium flow velocity since no flow velocity exists here anyway, which is largely independent on the temperature of the steel wall.

When lowering the nozzle wall temperature at first lower layers of the melt are slowly cooled down due to heat transfer and thus smaller shear velocities and subsequently smaller flow velocities are effected. A change of the nozzle wall temperature in the same range as mentioned above, i.e. +/−30° C., has a less clear effect and provides changes of the medium flow velocity of about +/−7%.

However, the embodiments described in the following can be applied also to other plastics than hard PVC.

Typically, the extrusion nozzles 60 are temperature controlled such that the nozzle body has a temperature which corresponds to about the average mass temperature of the plastic melt, i.e. the extrusion nozzle 60 is temperature controlled at about 190° C. (for instance in case of PVC). In case of hard PVC a nozzle wall temperature is adjusted in the main part of the nozzle gap from 190° C. to 195° C.

If in case of a double extrusion two similar extrusion nozzles 60 are charged in parallel then it is to be expected that the same mass flow flows through both nozzles, in each case the half of the total mass flow. This applies more or less, but differences up to 10% can occur since the throughput reacts very sensitive to slight geometrical differences due to unavoidable manufacturing mistakes as well as to slight differences in the temperature field of both mass flows.

By increasing the one nozzle wall temperature and lowering the other nozzle wall temperature in each case by up to 5° C. the throughput differences can be compensated. Since the whole extrusion nozzle 60 is affected in each case by the temperature change, all wall thicknesses of the plastic profile 10 are affected essentially in the same manner.

However, in case of complex hollow chamber profiles (see FIG. 2) the effect on the inner walls 13 is considerably less than the one on the outer walls since the temperature change does not affect so strongly the mandrel parts of the extrusion nozzle 3.

Furthermore, the effect of the temperature control also depends on whether only a channel wall is affected by the temperature change—if said wall forms a hollow chamber—or if both channel walls are affected—if single wall profile sections 11 sticking out are formed. Thereby, the limits of a general change of the nozzle temperature are also shown; single wall profile sections 11 change their wall thicknesses about twice as strong as a hollow chamber—profile sections 13, inner walls are almost not influenced.

Within the scope of the device described here and the described method the nozzle wall temperature is temperature controlled in a targeted manner at least in a wall region A, i.e. a nozzle wall temperature is adjusted, which is above or below the average temperature at the extrusion nozzle 60.

In principle, all means are suited for the embodiments, which can effect in a targeted manner (for instance for wall regions A of the flow channel 3, 12) a local change of the nozzle wall temperature.

For instance, temperature controlled channels 2 are provided in the extrusion nozzle 60 in spatial proximity to the profile sections 11 to be temperature controlled, through which temperature control fluids such as oils, air and other gases are passed.

Additionally or alternatively, electrical heating elements can be used in spatial proximity to the profile sections 11, 13 to be temperature controlled.

It is preferred to use thermoelectrical elements, as for instance Peltier elements, which are arranged in spatial proximity to the wall region of the extrusion nozzle 60 to be temperature controlled. It is hereby of an advantage if a heating or a cooling can be directly provided by adjusting the current flow. A thermal processing of fluids is omitted.

It is preferred if the local change of the nozzle wall temperature is required only in a small length area A in comparison to the total length of the extrusion nozzle 60. Thereby, the temperature control occurs preferably close to the nozzle outlet area. Extrusion nozzles 60 for window profiles have a total length of about 150 to 300 mm. The temperature changes by the local temperature control device occur preferably only on the outlet side in the length area up to 100 mm upstream, wherein the length dimension of the wall region to be temperature controlled should be itself about 20 to 80 mm. The further upstream the temperature change is affected, the broader is the profile section which is affected by the thickness change what is however in most cases not desirable.

In case of extrusion nozzles 60 for window profiles this affects either only the outlet plate 1A (typical thickness about 15 to 25 mm) and/or the next following nozzle plate 1B upstream, i.e. counted against the extrusion direction E. The typical thicknesses of the nozzle plate 1 are about 20 to 50 mm.

In view of the objective scope and surroundings of extrusion nozzles 60 (high pressure of the melt, insulating effect in parting planes for the plastic melt and the temperature fluid, panel heaters on the outside surfaces amongst others) air is very well suitable as temperature control medium.

Air as temperature control fluid has the following advantages, wherein further preferred operations and controls are described later:
  No closed temperature control cycle is required. The air has only to be operated or controlled on the inlet side, on the outlet side it can be blown into the open air. If for instance pressurized air at room temperature is used for flowing through cooling channels with a gap width of about 2 mm and if the supply and drain holes in the extrusion nozzle 60 have a diameter in the range of 2 to 5 mm, then a pressure in the range of 0.05 to 0.3 bar is sufficient on the inlet side in order to lower the temperature at the flowing channel wall sectionally by about 3 to 20° C. If due to constructional reasons smaller dimensions are required for the temperature control channel and/or the supply holes, the desired cooling effect can be achieved by increasing the upcoming pressure up to 6 bar and above without a problem.
  No impurity at an uncontrolled discharge or in case of leakages has to be afraid of.
  The effect, that means the cooling or heating effect, can occur to the required extend primarily by changing the air throughput by constant temperature of the air (either air at room temperature for cooling purposes or air at an increased temperature up to 500° C. for heating purposes. The heating of the air can occur very simple in a heater fan or hot air dryer.)
  Different temperature control regions of the wall of the extrusion nozzle 60 can be charged with a common air supply.
  There is no interaction, if the power of the air supply (total throughput and pressure) is sufficiently high. The required power for supplying multiple profile sections 11, 13 is in any case comparatively low (the total blower power—without heating supply—of less than 300 W is sufficient most of the times), such that this power is negligible low when operating the extrusion line.
  If the main parameters for the temperature control are adapted beforehand well to the task (cross section of the temperature control channels 2, distance to the channel wall thereof, sufficient inlet pressure by supply via a simple blower amongst others), then hardly larger disturbances due to erroneous operation are to be expected since the local nozzle temperature cannot be changed as much that a profile breakaway is unavoidable.
  The changing of the air throughput can occur very simple via throttles or by changing the pressure on the inlet side.
  An overpressure of 0.3 bar as maximum pressure for the charging of a cooling (heating) zone is mostly sufficient. Already in case of an inlet pressure of 0.05 bar (after a throttle) the effect onto the wall thickness of the profile section 11, 13 is clearly recognizable.

Although the invention shall not be restricted to air as a temperature control fluid, it could be shown in tests that the desired purpose, the lowering of the local nozzle wall temperature in narrow regions A (from a spatial point of view) and in temperature ranges up to 20° C. can be very simply achieved with a low technical effort by charging with room air and a starting pressure of less than 0.3 bar.

It is a reasonable strategy when adapting the extrusion nozzle 60 by reworking to adapt the wall thicknesses of all profile sections such that the single walled projecting profile sections 11 correspond well to the set wall thicknesses without charging with cooling air or are at most slightly above the set values. A quality-conform profile production is then possible without specific measures.

If the extrusion parameter change in a way that critical profile sections 11, 13 become "relatively" too thick and therefore a reduction of all wall thicknesses is required, the thickening of the wall strength can be prevented by charging these profile zones with cooling air.

On the whole, it is possible with the embodiments described herein to adjust independently from each other the wall thicknesses of different critical regions in respect to the wall thicknesses of hollow chambers which cannot individually be influenced during the extrusion. This allows the lowering of the running meter weight of the plastic profiles 10 close to the lower limit, since the weakest member, thus the thinnest profile section, cannot require a general increase of all wall thicknesses. If one considers that the use of the usual thickness tolerances of the running meter weight would change about +1-10% then it is clear by which degree the efficiency increases if one could lower the average running meter weight by only a few percent.

The use of the local temperature control is not restricted only to single wall profile sections 11, but can also be extended to any profile sections 13, thus also to hollow chamber regions. Even the thickness of inner walls 13 of profiles can be changed with these embodiments without mechanical rework in a running extrusion operation.

Temperature control channels 2 with crosssectional dimensions in the millimeter range (for instance thickness vertical to the plastic profile 10: 1 to 2 mm, width parallel to plastic profile: 2 to 6 mm) can be placed preferably along the channel limitations for this purpose, such that these cooling channels can be charged with air in a targeted manner. Through the extrusion nozzle 60 a supply channel to the actual charging zone is provided in form of a hole or milled recess in a parting plane. The air outlet (see for instance FIG. 3) could occur in the simplest case on the front side out of the nozzle. If this outlet is located then in the area of hollow chambers, it is readily possible to dissipate the air stream through the profile since only a relative small volume stream has to be dissipated, which influences only to a small extend the temperature and pressure gradient in the hollow chamber.

On the other hand the flow direction of the cooling air could also occur in the opposite that means the air is aspirated at the nozzle housing, wherein the throttle part is located in the aspiration line, and the air is sucked in from the front side of the nozzle, possibly also from profile hollow chambers.

A few embodiments will be explained in more detail in the following.

FIG. 1 shows the nozzle plates 1A, 1B of an extrusion nozzle 60 for a frame profile (FIG. 2) made of a plastic profile. The nozzle plates 1A, 1B comprise a flow channel 3, which leads to the outlet of the extrusion nozzle 60. The other plates as well as the mandrel parts 7 are not illustrated here for clarity reasons.

The form shaping contour is typical for window profiles (see FIG. 2 in cross section): The hollow chamber regions of the plastic profile 10 are formed by the channel wall of the nozzle plate 1A, 1B and by the mandrel parts 7 not illustrated in the picture. The projecting single wall profile sections 11 are shaped by the illustrated peripheral flow channels 12, wherein in each case the flow channel 3 delimits the single wall profile sections 11 on both sides (and also at the end; thus U-shaped) and is only formed by the nozzle plate 1A, 1B itself.

In FIG. 1 the outlet openings of the temperature control channels 2 for air are illustrated in the front view, the course thereof within the outlet plate 1a is illustrated in the following. The temperature control channels 2 illustrate here an embodiment of a local temperature control device, wherein alternative embodiments will still be described. Basically, the local temperature control device 2 can comprise for instance multiple temperature control channels 2, which all can have identical or different temperatures. A local temperature control device 2 allows the specific temperature control of singular wall regions (sections) of the flow channel 3 for a plastic profile 10, for instance specifically for a single wall region 12 of the plastic profile 10. The local temperature control device 2 does not heat or cool the complete flow channel 3 at the complete circumference, but only specific wall regions A in order to influence specifically and local the flow of the plastic melt.

It becomes apparent in the front view that the temperature control channels 2 are arranged and shaped spatially such that they surround the peripheral flow channels 12, which form the single wall profile sections 11, at least partially in proximity in order to allow an efficient and specific temperature control of the peripheral flow channels 12. Thus, at least one temperature control channel 2 is assigned to each of the peripheral flow channels 12. A temperature control zone is formed about the temperature control channels 2 within the wall of the flow channels 3, 12.

The wall region A of the flow channels 3, 12 results from the temperature control zone, wherein said wall region a can be specifically heated or cooled by the local temperature control device 2.

In FIGS. 3, 4 and 6 the heat transfer to the wall region A to be temperature controlled is illustrated by arrows.

In FIG. 3 a cross section (characterized in FIG. 1 by the section A-A) of the nozzle plate 1 is illustrated. The extrusion direction E is illustrated by an arrow. Thereby, a temperature control channel 2 is assigned to the peripheral flow channels 12 in each case in narrow spatial distance. In FIG. 1 the inlet lines 9 for the temperature control channels are illustrated.

The air supply of the temperature control channels 2 occurs in the illustrated embodiment such that the air (for instance as cooling medium at room temperature) is transported sideways via the inlet lines 9 into the nozzle plate 1. The inlet lines 9 continue parallel to the width side of the nozzle plate 1. In the region of the peripheral flow channels 12, the inlet lines 9 meet the temperature control channels 2, which continue here parallel to the peripheral flow channels 12. It is deducible in the sectional view of FIG. 3 that an inlet opening 4 for the air is arranged in each of the temperature control channels 2.

The temperature control channels 2 are closed in each case by a plug 14 (for instance made of copper) in extrusion direction E looked at from the inlet side, such that in case of slight leakages in the parting plane to the neighboring nozzle plate no plastic melt can penetrate from the flow lines what could provide a clogging of the temperature control channels 2.

Air as temperature control medium exits thus at the front side of the nozzle plate 1A.

The temperature control channels 2 are preferably produced by means of wire erosion and are arranged in a distance of about 1 to 3 mm almost parallel to the flow channels 12.

The flow velocity of the air in the temperature control channels 2 is mechanically adjusted for instance by a valve or another throttle device 30 and provides a corresponding temperature decrease of the wall of the temperature control channel 2, which affects due to heat transfer the wall temperature in the wall region A of the flow channel 12 for the plastic melt and changes the flow resistance and thus the local flow velocity of the plastic melt.

In FIGS. 3 and 4 the wall region A to be temperature controlled is illustrated in the region of the wall of the flow channel 3, 12.

In context with FIGS. 2 and 3 an embodiment is illustrated in which the temperature control channels 2 are used with air as temperature control medium for a specific cooling. If the air is heated before entering the temperature control channels 2, also a specific heating can be carried out with the same arrangement, what also allows for a specific adjustment of the flow velocities of the melt. In this case, the flow velocity is increased.

Basically, in general, another gas or liquid as for instance water can also be used as temperature control medium.

As will be explained later, the temperature control can occur with a suitable operation or control device depending on the profile characteristics.

A second embodiment is illustrated in FIG. 4 in which the temperature control channels 2 are built in to the second nozzle plate 1B (counting direction of the plates opposite to the extrusion direction E).

The temperature control channels 2 comprise an inlet line as well as an outlet line for the temperature control medium, wherein the inlet lines 9 are basically arranged such as illustrated in FIG. 1, namely sideways of the second nozzle plate 1B. The lines leading away are arranged parallel thereto. In FIG. 4 an inlet opening 4 and an outlet opening 5 for the temperature control medium are illustrated in each temperature control channel 2, respectively. The temperature control channels 2 are thereby insulated appropriately with respect to the departing planes by plugs 14.

In contrast to the first embodiment the plastic melt exits only from the first nozzle plate 1A.

In other embodiments temperature control channels 2 can be worked into the first nozzle plate 1A as well as in the second nozzle plate 1B. Basically, the temperature control medium can have the same temperature in the respective temperature control channels 2. It is however also possible that in the temperature control channels 2 temperature control media flow which are differently temperature controlled. The respective temperature control media can also be different.

The temperature control does not have to occur exclusively with media as for instance cooling or heating air. Additionally or alternatively, an electrical thermo element can also be provided for heating and/or cooling as local temperature device 2 which sectionally heats or cools the wall of the extrusion nozzle 60, in particular in the flow channels 12.

In the third embodiment the application of an electrically operated heating body 2 for the sectional temperature control of a nozzle plate 1 as extrusion device is illustrated. Heating cartridges 2 are inserted therefore in the drilled holes provided for this purpose. Instead of heating cartridges 2 cooling cartridges 2 can also be inserted, in which an electrically induced cooling effect, for instance due to the Peltier effect, is affected. Peltier elements are usually formed as flat component parts such that they can be arranged in the corresponding pockets in the nozzle plate 1 in a space saving manner.

Additionally, it is of an advantage to thermally insulate the wall region A towards the nozzle body, wherein an air gap 6 as illustrated in FIG. 5 is appropriate. Alternatively, a material with a lower thermal conductivity can be provided instead of the air gap 6.

In general local temperature control devices 2, which were described in the previous embodiments, can also be combined with each other. Thus, in one and the same nozzle plate 1 *a* temperature control channel 2, as well as an electrical thermo element can be used as local temperature control devices 2.

The previous embodiments were directed in particular to a sectional temperature control of the nozzle channel 3 in the region of the single wall profile sections 11. This does not have to be necessarily the case. Additionally or alternatively the wall regions A of other profile sections 13 can also be specifically temperature controlled.

This allows for changing also the wall thickness of inner walls 13 of a plastic profile 10 (hollow chamber profile) as this is illustrated in context of FIG. 6. In this example the mandrel parts 7 are also plotted, which are required in order to be able to extrude a hollow chamber profile 10 with inner walls 13. Without going into the different embodiments, how these mandrel parts 7 within the extrusion nozzle 60 can be mounted by releasing the flow channels, a common embodiment is described: the mandrel parts 7 are mounted on the nozzle body with bars 8 (in FIG. 6 only selectively designated with referent signs) and have the same longitudinal extension as the nozzle plate 1. The bars 8 however do not extend until the nozzle outlet, but are set back in respect to the outlet area by about 5 to 15 mm. In the region of the bars 8 multiple, spatially separated flow channels for the plastic melt are thus formed. Only after the ending of these bars 8 a singular enclosed flow channel 3 is formed, which finally shapes the plastic profile 10 as a whole.

In the nozzle plate 1 the connecting channels 9 for the temperature control medium, here again air, are also illustrated besides the nozzle opening 60.

In extrusion direction E after the bars 8 the singular strands weld with each other to the plastic profile 10 by forming so called welding seams.

In FIG. 7 a detail view of FIG. 6, namely the upper part of the extrusion nozzle 60 is illustrated. In FIG. 8 the same section is illustrated as a perspective section. The top view onto the section is illustrated in FIG. 9.

Temperature control channels 2 are worked thereby into the nozzle plate 1 as extrusion device, which are located spatially in direct proximity to an inner wall 13 to be extruded (see FIG. 2). This inner wall 13 forms (see FIG. 2) the upper wall of the larger hollow chamber in the extrusion profile 10.

The sectional view is in the area of the spokes 8 and within the temperature channel 2 and the inlet and outlet lines 9 of the temperature control medium. Thereby also parts of the flow channel 3 for the plastic profile 10 on the outlet side are recognizable.

Due to stability reasons the temperature channel 2 is designed meander like shaped (see arrows in FIG. 9). In order to avoid clogging by intruding melt or impurities the temperature channel 2 is closed on all sides. The closing at the front sides of the mandrel segments occurs here by pressing in a closure plug 14 made of cupper. Since the spokes 8 should be preferably narrow only a small drilled hole is available for the inlet and outlet of the temperature control medium. In order to achieve still a sufficient temperature control effect a high flow velocity of the temperature control medium is required which can be obtained readily by an adequate pressure in the inlet line. In case of air pressures (over pressure) below 6 bar, mostly such below 1 bar are sufficient.

The wall region A in the embodiment according to FIGS. 7, 8 and 9 is thus an essentially rectangular region, through which the temperature control channel 2 continues meander like.

As shown in the embodiments it is sufficient to temperature control the corresponding peripheral flow channel 12 of the extrusion nozzle 60 for the plastic melt only sectionally, like only on one side or on one side and the front limitation.

The more wall regions A of the flow channels 3 are effected by the temperature change the more intensive the melt throughput reacts onto a certain temperature change, for instance a temperature decrease by 5° Celsius in the illustrated angular regions on the flow channel wall affects a reduction of the wall thicknesses (here PVC) in the assignable profile regions by about 0.1 mm. If the temperature decrease by 5° Celsius affects both sides and the front limitation of the flow channel 3 than the wall thickness reduces by about 0.1 mm.

The temperature control channels 2 do not have to be arranged in the outlet plate 1, as partially described, but can also be provided in nozzle plates 1B arranged further upstream. It is thereby convenient to insulate the temperature control channels 2 on both ends, whereby an additional outlet hole has to be provided. Since preferably only the inlet lines 9 are used for the control of the temperature control intensity multiple outlets lines can be combined and can be guided outwards in a single hole or milling groove in the parting plane.

Figure 12:
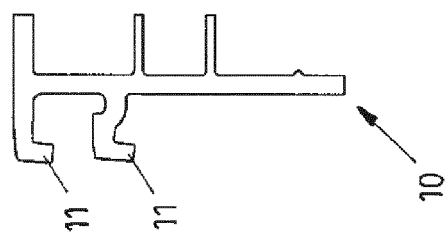
FIG. 12 shows a cross sectional view of a section of a plastic profile with a profile section which is only insufficiently filled out.
Figure 11:
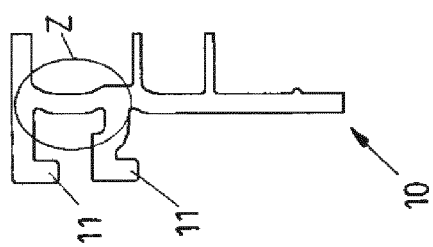
FIG. 11 shows a cross sectional view of the section of a plastic profile with partially overflown profile sections.
Figure 10:
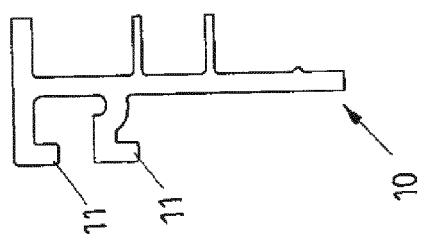
FIG. 10 shows a cross sectional view of a section of a plastic profile with correct shaping of the profile sections.

In FIGS. 10 to 12 a section of the plastic profile 10 with differently shaped wall thicknesses is illustrated, respectively, wherein FIG. 10 shows the plastic profile 10 with correct wall strength of all profile sections 11, which are obtained if all influential factors, in particular the extrusion parameters and the flow parameters have the correct values.

In FIG. 11 typical deformations are schematically illustrated which occur if in the region of the two single wall hooks 11 the melt advances, that means if here the flow velocity at the nozzle outlet and thus the local through put relative to the withdrawal velocity is too high. The excess melt is forced at the inlet of the dry calibration towards the hollow chamber and provides the "wave like" shape of the vertical profile wall (see reference sign Z in FIG. 11).

If in the present case the wall thicknesses are also too thick in the region of the hollow chambers than the plastic profile 10 can be brought into the correct shape with known measures: the withdrawal velocity of the plastic profile 10 is increased relative to the throughput of the plastic melt. At the same time all wall thicknesses are reduced and the advancement of the hooks is reduced or completely eliminated.

If in contrast the wall thicknesses in the hollow chambers are correct or even at the lower tolerance limit than the geometry mistake can be corrected by applying of one of the embodiments: cooling air as temperature control medium is blown through the temperature control channels 2, which are assigned to the overflown hooks 11 (i.e. to a single wall profile section). By changing the flow characteristics of the plastic melt in this spatially delimited region only the wall thickness of the hooks 11 is reduced. The pushing of the excess plastic melt towards the hollow chamber is prevented and the vertical wall obtains the desired straight shape without that the wall thickness is also here reduced.

The described embodiments allow to adjust the wall thickness in different profile sections 11, 13 almost independently from each other during the profile extrusion and to optimize it separately in each case. The results are dimensionally correct plastic profiles 10, less waste and plastic profiles 10 close to the lower meter weight tolerance, since unavoidable wall thickness deviations at certain locations can be specifically compensated.

In FIG. 12 the cross section of the section of the plastic profile 10 of FIG. 10 is illustrated, wherein in the region of the two hooks 11 too little material is present. The wall thicknesses are too thin, the surfaces are warped and the edges are insufficiently developed. Functional measures are not met. The section of the plastic profile 10 is not according to the dimensions.

If the extrusion velocity is lowered in analogy to the above described proceeding the hook regions 11 are filled again, but simultaneously also all remaining wall thicknesses are increased. Due to the higher meter weight such an extrusion would not be economical.

The wall thickness in the region of the hooks 11 can be increased with the described embodiments without that all remaining wall thicknesses are increased: the temperature channels 2 are now used as heating channels. The air introduced in analogy to above is preheated to a temperature of about 300 to 500° Celsius. Due to this temperature increase spatially limited regions in the walls of the flow channels 12 for the plastic melt are heated in a targeted manner.

This increased temperature of the wall of the flow channels 12 reduces the flow resistance of the plastic melt and the flow velocity increases only in those regions, in which an increased temperature is effective. As a result dimensionally correct plastic profiles 10 are again obtained, less waste is accumulated and plastic profiles 10 are close to the lower meter weight tolerance, since unavoidable wall thickness deviations on specific locations can be specifically compensated.

FIG. 13 shows sectionally the extrusion of a plastic profile 10, wherein the extrusion direction E is indicated by an arrow.

The inflow area of the dry calibration 20 is illustrated on the left, the outflow area of the extrusion nozzle 60 with the nozzle plate 1 is illustrated on the right. The plastic material moves through the flow channel 3 of the extrusion nozzle 60, then shortly free in space and reaches the dry calibration 2 on the left.

According to common extrusion parameters the plastic melt strand expands after leaving the extrusion nozzle 60 by about 20% (i.e. the extruded plastic profile 10 is widened as schematically illustrated in FIGS. 13, 14 and 15), what is due to the withdrawal velocity which is slower compared to the average flow velocity in the extrusion nozzle 60.

A temperature control channel 2 for locally influencing the wall thickness of the plastic melt strand 10 is illustrated in the outlet plate 1A. In this example, the temperature control channel 2 is charged with air at room temperature; thus, the temperature control channel 2 is used for cooling. The air throughput through the temperature control channel 2 can be adjusted via a throttle device 30, for instance a manually operated valve. No air flows at a closed throttle device 30. The wall of the flow channel 3 for the plastic melt strand 10 is not actively cooled. Thereby, a temperature equilibrium is adjusted in the extrusion nozzle 30 and the local melt throughput in the illustrated region reaches its maximum.

If this maximum provides an overcrowding in the calibrator inflow, which is recognizable if the illustrated air gap 17 is smaller than 0.1 mm and the melt builds up in the intermediate space between extrusion nozzle 60 and the dry calibration 20, and "bulges" characteristically then the cooling effect can be gradually increased by a gradually opening of the throttle device 30, in the simplest case per hand, what directly results in a reduction of the melt throughput.

In case of the examples and embodiments or dimensions described here, the response time is about 2 to 10 seconds, at maximum about 1 minute, i.e. the effect of adjusting the temperature control can be recognized very fast and also the new temperature equilibrium of the extrusion nozzle 60 is adjusted comparatively fast. If a suitable adjustment is found, thus the local throughput in the respective segment is brought close to the target range the production runs stable over a long period of time as long as no disturbances occur.

In principle, all known control procedures are more or less applicable. The wall thickness and/or the filling level in a specific profile section 11 is the control value and the input values of the temperature control device 2, e.g. the position of the throttle valve in the throttle device 30 and/or the temperature of the temperature control medium are the regulating variables. The regulating variables effect then the temperature of the channel wall and thus the throughput or the flow velocity.

In FIG. 13, a temperature control device 2 is illustrated in which in the simplest case the temperature in the flow channel wall, i.e. the wall region A, can be changed by manual adjusting a throttle device 30.

For this purpose the wall thickness of the plastic profile 10 is observed by appearance or is measured by a suitable measuring device 40. The flow throttle 30 is adjusted by hand such that the profile section 11 has the desired thickness. Without a continuous observation or measurement, thus also without a further adjustment of the flow throttle, it can then be extruded over a longer period of time.

If this arrangement is extended by a control device 50 (e.g. a controller or computer), then an automatic control circle can be formed. The measuring device 40 measures a characteristic dimension (wall thickness, air gap and/or bulging etc.). If this dimension deviates from the target dimension, then the control device 50 affects an adjustment of a flow throttle. Measurement and adjustment occur continuously and automatically, thus one talks about a control.

Instead of the throughput of the temperature control medium, the temperature thereof can also be alternatively adjusted.

If the wall thickness is detected electronically, then suitable algorithms can be integrated digitally and the regulating variables can be charged accordingly. However, a certain effort is hereby overall required since measuring devices 40 for wall thicknesses, electrically controlled adjusting members etc. are typically required for four to eight profile sections.

Thereby, narrow process limits have to be met. If the "maximum acceptable" wall thickness is exceeded at only one position briefly, then this provides inevitably a breakaway of the plastic profile 10. Multiple working hours can be required until the renewed start-up and reaching of all quality parameters.

The control value wall thickness can be detected in different ways: A direct measurement of the wall thickness can occur by an ultrasound, optical or laser measurement. Furthermore, the distance (air gap) between plastic profile 10 and calibrator wall can be used as measuring value using the mentioned measurement methods also therefore. The measurement methods can also be used in combination with each other.

A difference pressure, e.g. the back pressure when charging the air gap with a specific starting pressure, can be used as a measuring signal comparatively easy to be generated. The measuring signal, the back pressure, changes with the gap width (see for instance FIG. 14), which is provided for the outflow of the temperature control medium (e.g. air): if the material rests directly against an outlet opening 15 for the measurement air, said opening is closed and the back pressure reaches its maximum. If the gap enlarges, the back pressure is lowered.

A mechanical measurement is suitable as a measurement variable as well: A measuring probe rests against the surface of the plastic profile 10 and measures wall thickness deviations. —It is in principle not required at all to know exact numeral values for the wall thickness, at the end it is only important to maintain a status defined as reliable or optimal by the control.

The measurement of the wall thickness can occur in principle at any positions, somewhere downstream of the extrusion nozzle 30.

If the measurement occurs in the intermediate space between the extrusion nozzle 60 and the dry calibration 20, or in the inflow area of the first dry calibration 20, then the final velocity profile, thus the constant velocity of all melt particles corresponding to the withdrawal velocity is not fully established and yet larger deviations are present locally, that means in particular that for instance single wall profile sections 11 (i.e. hook sections) form characteristic bulges and that when adjusting the alignment of the extrusion nozzle 60 and dry calibration 20, this bulge can experience comparatively large displacements or shape modifications. Although no good matching with the profile geometry exists at such a position, this bulging can provide a suitable measuring signal, which can be used as control variable.

After the target status is available by the adjustment of different parameters, this status shall only be maintained by the control. That means, if the bulging gets smaller, then this is a sign for a smaller wall thickness and shall be counter-regulated by increasing the local throughput. That means also if manual or automatic adjustments are carried out, e.g. for adjusting the alignment between nozzle and calibration 20, the control has to be switched off for the time being in order to avoid undesired reactions. After activating the control said control has only maintain the present status and has not to approach certain absolute value.

If the measurement of the control variable occurs in the region of the dry calibration 20 downstream after the inflow area the profile shape corresponds mostly to the final product. Absolute values of the wall thickness or the gap correlate exactly to the profile geometry, thus they are optimally suitable as control variable. If the measurement occurs indirectly via the backpressure than an overlapping with the "applied vacuum in the calibration" occurs. This also means here that the backpressure should not/cannot approximate as an absolute variable, but that the control can only be used for maintaining a target status.

The measurement of the control variable can occur in principle also at the end of the extrusion process, thus after the cooling of the plastic profile 10 and obtaining the final contour, for instance after cutting to length the profile rods (for instance by sensing the front faces or scanning the front faces or measuring the outer contour of the complete profile by means of laser measurement methods and other methods). A disadvantage is hereby however the large time distance between adjusting and entry into force in the extruding nozzle 60 and measuring the control variable (practically about 5 to 10 minutes) such that interim erroneous adjustments cannot be compensated and profile breakaways have to be accepted in the extreme case.

A simple self-control arrangement is described in context with FIG. 14. The specialty hereby is that almost or even completely it can be abstained from an electronical detection of the control variable and/or from an electronical control circuit and/or from an electronical control of the control actuators and the installation requirement connected thereto.

The measurement variable is the back pressure in the air gap 17 of the dry calibration 20 on the inflow side. The wall thickness of the profile section 11 is indirectly detected. If the gap 17 between plastic profile 10 and the calibration wall is charged with a low overpressure (less than 1 bar, often less than 0.2 bar) than a back pressure builds up. This back pressure is larger the smaller the gap is, thus the larger the wall thickness of the plastic profile 10. The control actuator is charged with said back pressure, which changes the throughput of the temperature control medium in the desired manner.

A slider can serve as a control actuator, which influences the flow velocity of the temperature control medium. The extrusion nozzle 60 is tuned in this example such that in the initial state the target wall thickness is reached if the temperature control channel 2 is flown through with a flow velocity partially reduced by the slider. Herewith a sufficiently large control leeway is available.

The temperature control channel 2 as well as the outlet opening 15 for the measurement air are charged with an air flow 16. At first the desired thickness is adjusted by a manual adjustment of the throttle device 30, when the control is activated. As soon as the pressure in the measurement line changes the throttle 30 is adjusted due to the pressure or directly by this pressure as long as the same pressure is available gain which was present when activating the control. A complex control with a computer is not required. The throttle device 30 can be installed for this purpose similar to a servo valve. No electrical signal is required for the control, the adjustment occurs by the flowing media itself.

The back pressure serves indirectly as measurement signal, the larger the gap is the smaller is the back pressure.

In the present case the profile section 11 shall be cooled in the outlet plate 1 of the extrusion nozzle 60 in case of wall thicknesses becoming thicker, thus in case of a gap at the measurement position becoming smaller and a backpressure becoming larger. That means that the throughput of the cooling air as temperature control medium has to be increased, the control actuator has to open.

If in the opposite case the wall thickness is too small than the control actuator has to reduce the throughput in reaction to the back pressure becoming smaller, thus closing.

The initial situation of the control actuator (throttle device 30) can be manually adjusted, for instance via an adjusting screw, which is arranged between the automatic adjustment and the actual control actuator, the slider.

The outlined control system can be adapted with simplest auxiliary means in respect to the reaction behavior. If stronger deflections are desired, than the initial pressure being at maximum available or the flow velocity in the temperature control channel 2 has to be higher (at room temperature). The more directly the control system shall react the higher the pressure of the branched off measurement airflow has to be.

Different control systems can be charged in parallel by one single air supply in form of a blower. Since already a comparatively small blower (engine power 300 W, maximum pressure +0.2 bar (for comparison a household vacuum cleaner: engine power 1.8 kW, maximum vacuum pressure −0.2 bar)) is sufficient in order to control up to 10 segments wherein by no means the complete blower power has to flow through the temperature control channels 2, a mutual influence is not to be expected or only tolerably small.

In case of an embodiment of a simple control illustrated in FIG. 15 the back pressure when charging an air gap 17 in the dry calibration 20 serves again as measurement variable. The measurement position 15, which is charged with the measurement air flow 16, is now about in the average range of the first dry calibration 20 (counted in extrusion direction E). This has the advantage that the back pressure is not influenced by the relative position of dry calibration 20 to the extrusion nozzle 60, but only by the vacuum in the dry calibration 20, which is maintained usually anyway on a constant level.

The correct shaping of the profile segment 11 can hereby also be at first adjusted manually. A certain back pressure corresponds in the following to this status. If the control is then activated this back pressure is maintained automatically.

If a deviation from the target value occurs, since the air gap changes due to a change of the wall thickness of the profile section 11, then a control actuator, in this example a throttle organ 30, is charged, whereby the air throughput through the temperature control channel 2 is changed. The flow cross section in the throttle organ 30 is enlarged or reduced until the back pressure is again on the initial level when activating the control.

This invention is not restricted to window profiles made of PVC or other profiles made of any plastic. An application in other extrusion profiles, such as tube extrusion or blown film extrusion, when extruding flat products with white slot nozzles (flat films or plates) and other extrusion processes is of course suitable. In various extrusion methods thickness adjustments are done by mechanically adjusting the outlet gap, the gap height or the gap height in a region arranged upstream in order to approximate the thickness of the extrudate sectional to the target value. Very often controls are used thereto. Instead of the wildly spread mechanical adjustment of the gap height in specific width sections of the extrudate also the change of the temperature of the flow channel wall in specific width sections according to this invention provides the desired effect.

A further embodiment of an extrusion device with a local temperature control device 2 is illustrated in FIGS. 16 and 17.

The difference to the previously described embodiments is that the wall region in which the local temperature control occurs extends predominantly in the width and less in the length (i.e. along the extrusion direction E). The temperature control medium does also not flow in extrusion direction E but across thereto thus in the plate plane.

An increase of a temperature in the outlet region of the nozzle provides an increase of the glossiness of the surface. It is thus of an advantage to overheat the outlet region of the nozzle beyond the nozzle temperature.

In this embodiment the wall region of the flow channel A to be temperature controlled overlaps the complete width of an outer wall of the plastic profile 10. In contrast to the embodiments described so far the temperature control channel has a larger extension crosswise to the extrusion direction E and a reduced extension in extrusion direction E. The purpose therefore is that for instance a temperature increase of the wall region shall not provide a very distinct increase of the wall thickness. Only the outer most surface of the melt shall be heated at present, since thereby the glossiness on the surface of the merging profile is also increased, what is desired for some applications. In contrast the glossiness can also be somewhat reduced by a lower temperature. The temperature control channel 2 for influencing the flow channel wall temperature is arranged in this embodiment only in the nozzle outlet plate 1A and has an extension in extrusion direction parallel to the flow channel surface at a minimum of about 5 mm and as a upper limit the thickness of the nozzle plate 1A, preferably about 6 to 10 mm. The in- and outlet 9 for the temperature control medium are preferably arranged in a plane parallel to the plate plane, the temperature control medium flows through the temperature control channel essentially across to the extrusion direction E.

Figure 18:
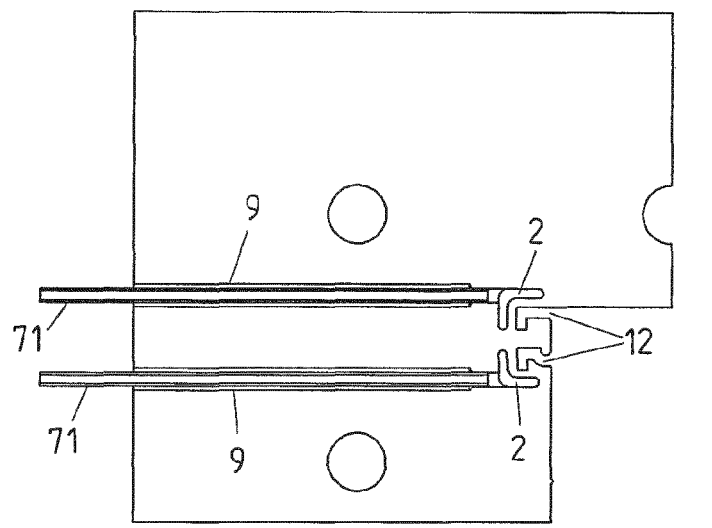
FIG. 18 shows a cross view of an embodiment with a thermal insulation of an inlet/outlet for temperature control medium.
Figure 19A:
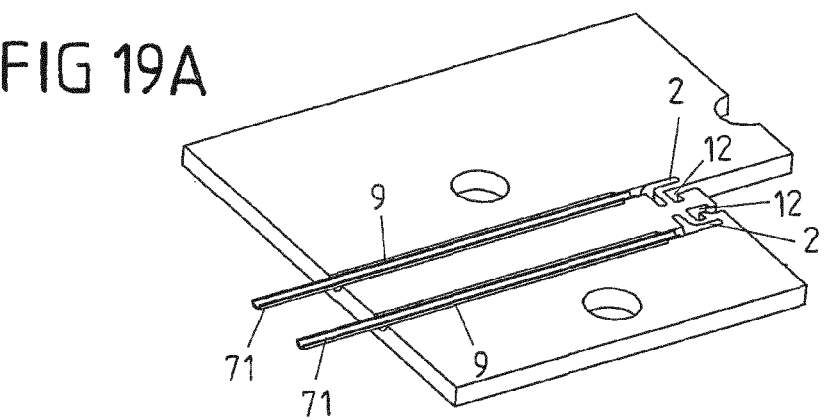
FIG. 19A shows a perspective view of the section according to FIG. 18.
Figure 19B:
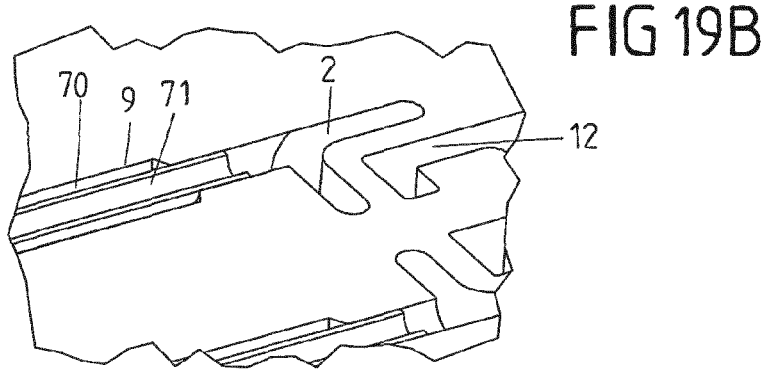
FIG. 19B shows an enlarged view of the section according to FIG. 19A.

In FIG. 18 a section of a nozzle plate 1 is illustrated, wherein said plate is provided with two local temperature control devices 2, as has already been described in the context with the other embodiments. In the illustrated section two inlets 9 for the temperature control medium to the local temperature control devices 2 are illustrated. In FIG. 19A the section according to FIG. 18 is illustrated in a perspective view. In FIG. 19B an enlarged section of FIG. 19A in the region of the local temperature control device 2 is illustrated.

In the illustrated embodiment the inlets 9 for the temperature control medium comprise a thermal insulating device 70, which provides an increased heat transfer resistance along the inlet 9. Here the thermal insulating device 70 comprises an air gap. The drilling hole for the actual inlet 9 is dimensioned somewhat larger for that purpose such that a temperature resistant plastic tube or a metal tube as fluid line 71 can be arranged in the drilling hole. The fluid line 71 has a smaller diameter than the surrounding drilling hole such that an air gap is formed about the fluid line 71. The temperature control medium flows through the fluid line 71 to the local temperature control device 2 (see in particular FIG. 19A).

The fluid line 71 is insulated thermally by the air gap 70 against the surrounding, i.e. the nozzle plate. As a result the heat exchange between the temperature control fluid and the nozzle plate is hampered such that the temperature control fluid faces smaller temperature losses. At the actual effective area, i.e. at the local temperature control device 2, a higher temperature gradient is established in comparison to if no insulating device 70 is used. The temperature change in the nozzle wall can be efficiently operated and controlled therewith.

If the temperature and/or the flow velocity is changed than the temperature field of the nozzle plate 1 changes. This can last for instance between 5 to 30 minutes what is relatively long. Due to the thermal insulation device 70 the nozzle plate 1 is better insulated against thermal influences by the temperature control fluid.

In FIGS. 18, 19A and 19B the thermal insulating device 70 is formed by an air gap. In other embodiments the thermal insulating device can also be realized differently. Thus it is possible to put a temperature coated plastic tube as fluid line 71 without an air gap into a drilling hole of the inlet 9. If the wall is thick enough and/or the plastic material has a sufficiently bad heat transfer than the air gap is not of importance.

Basically also multiple head insulating means can be used, for instance an air gap 70 in which an insulated metal tube is arranged.

This embodiment with a thermal insulating device 70 can be used with all other described embodiments.

LIST OF REFERENCE SIGNS

1 nozzle plate (for instance part of an extrusion tool)
1A Outlet plate (first plate)
1B second nozzle plate
2 Local temperature control device (for instance temperature control channel, electrical thermo element)
3 Flow channel for plastic melt
4 Inlet opening for temperature control medium
5 Outlet opening for temperature control medium
6 Air gap
7 Mandrel parts
8 Bars
9 Inlet/outlet for temperature control medium
10 Extruded plastic profile
11 Single wall profile section
12 Flow channel for single wall profile section
13 Inner wall of a hollow chamber profile
14 Sealing plug for temperature control channel
15 Outlet opening for measurement air
16 Inlet line for measurement air
17 Air gap in dry calibration
20 Dry calibration
30 Throttle device
40 Measurement device
50 Control device (computer)
60 Extrusion nozzle
70 Thermal insulating device
71 Fluid tube A Wall region of flow channel to be temperature controlled
Z Detail of a profile section

The invention claimed is:

1. An extrusion device for the extrusion of a plastic profile with at least one single walled profile section, in particular a nozzle plate, the extrusion device comprising:
   at least one plastic melt flow channel for the at least one single walled profile section;
   one or more other plastic melt flow channels for one or more other profile sections that exclude the at least one single walled profile section; and
   at least one local temperature control device positioned proximate to at least one wall region of the at least one plastic melt flow channel for the at least one single walled profile section to temperature control in a targeted manner the at least one wall region of the at least one plastic melt flow channel for the at least one single walled profile section for setting the flow speed of the plastic melt through the at least one plastic melt flow channel for the at least one single walled profile,
   wherein the extrusion device is devoid of local temperature control devices positioned proximate to the one or more other plastic melt flow channels.

2. The extrusion device according to claim 1, wherein the at least one wall region of the at least one plastic melt flow channel for the at least one single walled profile section is temperature controlled up to 30° C. above or below an average temperature of an extrusion nozzle.

3. The extrusion device according to claim 1, wherein the at least one local temperature control device is arranged in a spatial proximity to the at least one wall region of the at least one plastic melt flow channel for the at least one single walled profile section, in particular in proximity of an outlet opening of an extrusion nozzle.

4. The extrusion device according to claim 1, wherein the at least one wall region to be temperature controlled is arranged between 0 to 100 millimeters (mm) upstream from an outlet of an extrusion nozzle and/or the at least one wall region has a length dimension of about 20 to 80 mm and/or a width dimension of about 3 to 20 mm.

5. The extrusion device according to claim 1, wherein the at least one wall region to be temperature controlled is arranged in a nozzle outlet plate directly upstream of an outlet of an extrusion nozzle and the at least one wall region has a dimension in extrusion direction of 5 to 20 mm, and a dimension crosswise to the extrusion direction of about 20 to 150 mm.

6. The extrusion device according to claim 1, wherein the at least one local temperature control device comprises at least one temperature control channel, at least one electrical heating means, in particular an induction or resistant heating and/or at least one thermoelectric element.

7. The extrusion device according to claim 6, wherein the at least one local temperature control device comprises the at least one temperature control channel, and the at least one temperature control channel is flown through by a temperature control medium, in particular room air, cold and/or heated air, a gas and/or a liquid, wherein the flow through of a liquid occurs in particular in a closed cycle and the flow through of a gas occurs in an open cycle.

8. The extrusion device according to claim 7, wherein the cooled temperature control medium has a temperature between −50 to 30° C. in case of a gas and a temperature between 15 and 180° C. in case of a liquid, wherein in particular only an outlet zone of an extrusion nozzle is cooled.

9. The extrusion device according to claim 7, wherein the heated temperature control medium has a temperature between 250 to 500° C. in case of a gas and a temperature between 200 and 280° C. in case of a liquid, wherein in particular only an outlet zone of an extrusion nozzle is heated.

10. The extrusion device according to the claim 6, wherein the at least one local temperature control device comprises the at least one temperature control channel, and the at least one temperature control channel comprises a width extension according to a width dimension of an assigned wall region of the flow channel for the single walled profile sections and/or that a gap size of the at least one temperature control channel is between 0.3 to 5 mm.

11. The extrusion device according to claim 1, wherein the at least one local temperature control device is insulated thermotechnically in respect to an extrusion nozzle, in particular the nozzle plate, by an air gap and/or by means of a heat insulating intermediate layer such that higher temperature differences are effective on a surface of the at least one plastic melt flow channel for the at least one single walled profile section compared to on a surface of the one or more other plastic melt flow channels.

12. The extrusion device according to claim 1, further comprising an operating or control device for controlling the at least one local temperature control device for influencing a wall thickness of the plastic profile, wherein at least one measured value is the wall thickness, a gap size in a calibration device, a spatial extension of the plastic profile after leaving an extrusion nozzle and/or a measured back pressure in the calibration device.

13. The extrusion device according to claim 1, wherein at least one of a flow velocity, a rate of flow, a pressure or a temperature of a temperature control medium, in particular air, is set in a targeted manner before being fed into the at least one local temperature control device.

14. The extrusion device according to claim 1, further comprising an operating or control device for a timely change of a temperature of the at least one wall region of the at least one plastic melt flow channel for the at least one single walled profile section, in particular for setting a temperature transition of 5 to 15 K/min.

15. The extrusion device according to claim 1, further comprising a throttle device for setting a throughput of a temperature control medium in the at least one local temperature control device in a targeted manner, wherein the throttle device is coupled in particular to an operating or control device.

16. The extrusion device according to claim 1, further comprising a thermal insulating device for a temperature control medium for at least one sub region in the nozzle plate.

17. The extrusion device according to claim 16, wherein the insulating device comprises an air gap and/or an insulating material.

18. An extrusion device for the extrusion of a plastic profile with a plurality of single walled profile sections, in particular a nozzle plate, the extrusion device comprising:

a plurality of plastic melt flow channels for the plurality of single walled profile sections;
a main plastic melt flow channel for a main profile section that excludes the plurality of single walled profile sections; and
at least one local temperature control device positioned proximate to:
a single outer wall region of the main plastic melt flow channel for the main profile section;
at least one wall region of a first plastic melt flow channel for a first single walled profile section, wherein the first plastic melt flow channel is positioned at a first end of the single outer wall region of the main plastic melt flow channel; and
at least one wall region of a second plastic melt flow channel for a second single walled profile section, wherein the second plastic melt flow channel is positioned at a second end of the single outer wall region of the main plastic melt flow channel that is opposite the first end,
wherein the at least one local temperature control device is configured to temperature control in a targeted manner the single outer wall region of the main plastic melt flow channel and the at least one wall region of each of the first and second plastic melt flow channels for setting glossiness of portions of the main profile section and the first and second single walled profile sections that pass by the single outer wall region of the main plastic melt flow channel and the at least one region of each of the first and second plastic melt flow channels;
wherein the extrusion device is devoid of local temperature control devices positioned proximate to at least some remaining outer wall regions of the main plastic melt flow channel, the at least some remaining outer wall regions of the main plastic melt flow channel excluding the single outer wall region of the main plastic melt flow channel.

19. The extrusion device according to claim 18, wherein the single outer wall region of the main plastic melt flow channel for the main profile section and the at least one wall region of each of the first and second plastic melt flow channels for the first and second single walled profile sections are temperature controlled up to 30° C. above or below an average temperature of an extrusion nozzle.

20. The extrusion device according to claim 18, wherein the at least one local temperature control device comprises a single temperature control device arranged in spatial proximity to an outlet opening of an extrusion nozzle.

21. The extrusion device according to claim 18, wherein the at least one local temperature control device has a dimension in extrusion direction of less than 10 mm to influence a glossiness of portions of the main profile section and the first and second single walled profile sections that pass by the single outer wall region of the main plastic melt flow channel and the at least one region of each of the first and second plastic melt flow channels without influencing wall thickness.

* * * * *